Oct. 25, 1949.  M. ROADS  2,486,209
SICKLE MOWER
Filed Oct. 14, 1946  2 Sheets—Sheet 1
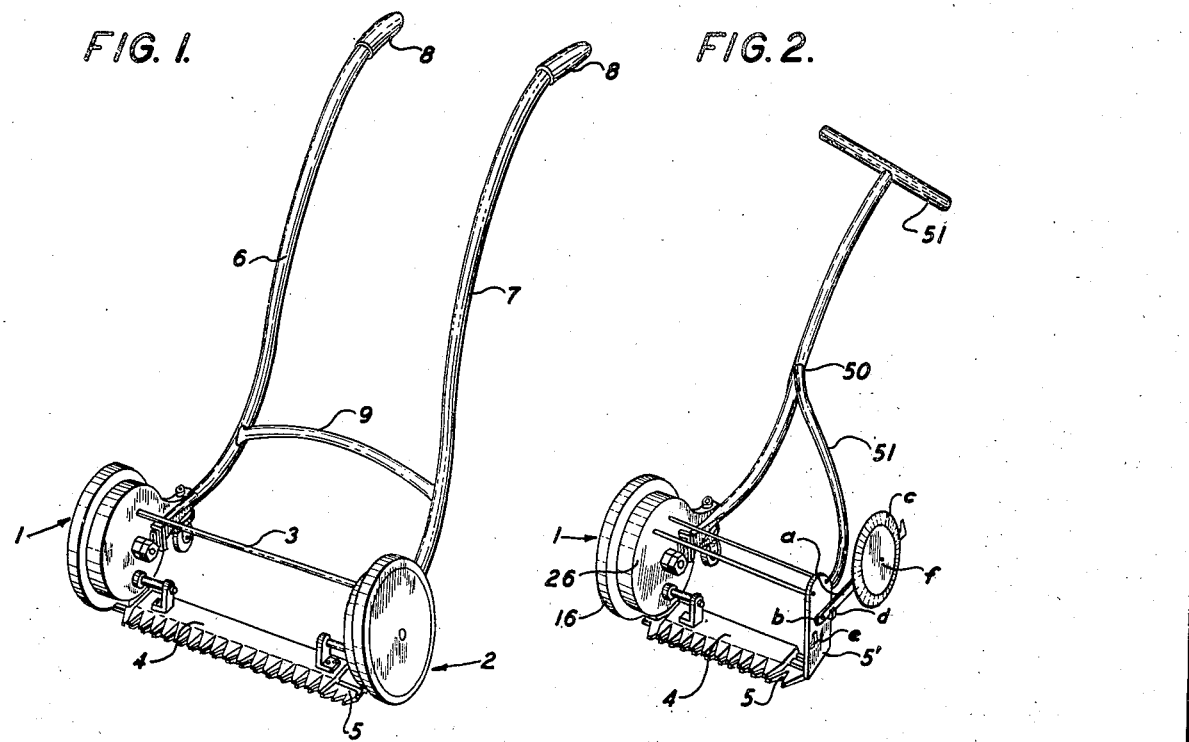
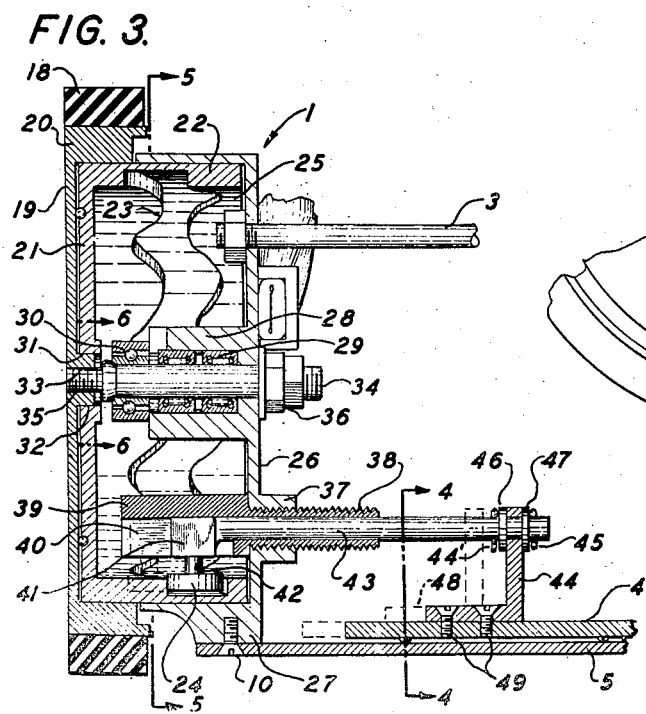
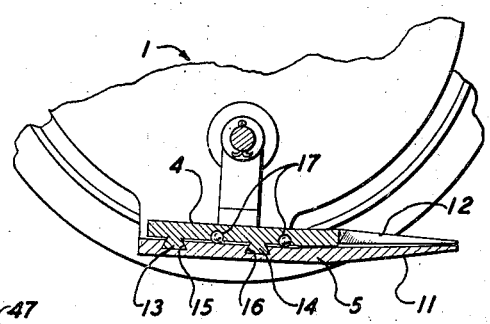
INVENTOR.
MIKEL ROADS
BY Earl E. Moore
ATTORNEY Oct. 25, 1949.                M. ROADS                2,486,209
                             SICKLE MOWER
Filed Oct. 14, 1946                              2 Sheets-Sheet 2

INVENTOR.
MIKEL ROADS
BY Earl E. Moore
ATTORNEY

Patented Oct. 25, 1949

2,486,209

UNITED STATES PATENT OFFICE 2,486,209

SICKLE MOWER

Mikel Roads, Los Angeles, Calif.

Application October 14, 1946, Serial No. 703,154

2 Claims. (Cl. 56—262)

1

This invention relates to mowers of the type which shears the grass rather than cut it by a series of rotary blades as is common in the lawn mowers now in general use. The shearing method of cutting grass in accordance with the teachings of this invention, makes a neat and tidy job regardless of the height of the grass, whereas the common rotary types of cutters cannot do a thorough cutting job when the grass is high.

The means employed in this invention consists in a pair of positive guided blades which have mutual sliding surfaces and which are reciprocated by mechanism which receives its power from a cam wheel that rides in a snake-like groove on the inner side of the wheel flange so that when the operator, or some mechanical power means, runs the wheels of the mower along a stretch of ground, the wheels rapidly reciprocate the cutting blades and their cutting extensions so as to neatly and thoroughly cut all upright stems of vegetation.

One of the principal objects of this invention is to present a new and novel type of grass cutter or shearer which is sturdy and simple in construction, reliable in performance, and which is economical to make and manufacture and to maintain in a good working condition.

Another object is to provide a lawn conditioner, that is, lawn mower, cycle mower and edger, which works on the shearing principle that utilizes a plurality of shearing projections which are attached to juxtaposed sliding plates that receive their relative motion from a cam-like wheel that rides in a serpentine groove of one of the wheels of the mower.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 is a front perspective view of a grass cutter showing a preferred form of the invention, Fig. 2 is a front perspective view of a lawn edger which employs the principles of the preferred form of the invention, Fig. 3 is an enlarged vertical sectional view of one end of the cutter shown in Fig. 1 or of substantially the entire length of the edger shown in Fig. 2, Fig. 4 is a vertical sectional view, enlarged, taken substantially along the line 4—4 of Fig. 3, Fig. 5 is a vertical sectional view taken substantially along line 5—5 of Fig. 3, Fig. 6 is a sectional view of a detailed part, enlarged, taken substantially along the line 6—6 of Fig. 3, Fig. 7 is a front elevational view of a slightly modified form of the invention.

Figure 5:
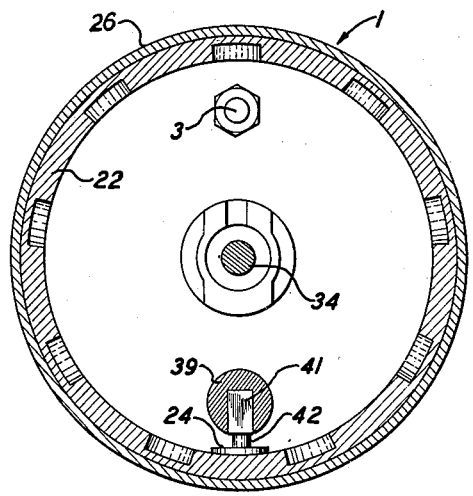

In all forms of the invention, the wheels and reciprocating mechanism are the same, and are, therefore, given the same reference numerals. As clearly shown in Fig. 1, the preferred form of the invention comprises the two end wheel units 1 and 2 joined together by the tie rod 3 and the two sliding plates 4 and 5. From the wheel unit 1 extends a tubular handle means 6 and from the wheel unit 2 extends a similar tubular handle means 7, the upper ends of each is provided with a non-skid type of gripping means 8 and across the lower portions of these tubular handle means is a bracer tube 9.

The bottom cutter plate 5 has its ends fixed to the wheel units by screws 10, see Fig. 3, and its forward end has a plurality of tapered shears 11 extending forward thereof; the tops of the shears being flat and juxtaposed with the bottom flat surfaces of a plurality of similar shears 12 which extend forwardly from the top cutter plate 4, as shown. The top plate 4 is the reciprocable one and has the integral elongated dovetail-like tongues 13 and 14 which slide and ride in the elongated dove-tail-like grooves 15 and 16, respectively. The ball bearings 17 are provided, as shown, in spaced apart relationship to reduce friction and greatly aid the operation of the mower, especially when pushed by hand.

Each wheel has a rubber tire 18 which is fixed to the outer perimeter of an annular shallow cup-shaped element having the disc-like plate 19 with the integral annular rim or flange 20. Within the confines of the flange there is a disc-like plate 21 having a relatively heavy annular integral deep flange 22, the inner surface of this latter flange having an endless serpentine groove or cam track 23 to accommodate a cam-like wheel 24. The inner side of the wheel, therefore, is provided with a chamber 25 and has a closure cup-like element 26 to protect the mechanism with the wheel chamber and provide a boss means 27 for the cutter plate holding screws 10.

Figure 6:
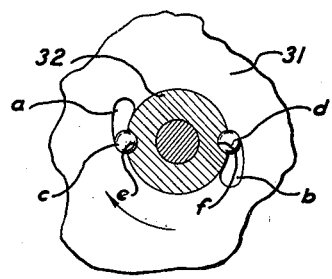

The closure plate has a bearing cup 28 within the chamber of the wheel and is provided with suitable roller bearing means 29, and a thrust ball bearing means 30. The plate 21 has an opening or bore 31, the sides of which having bearing surface upon the outer preimeter of a cylindrical boss 32 of the axle threaded opening or bore 33. The axle is indicated at 34 and has a threaded end 35 which is screwed into the threaded bore 33 and the other end also threaded to receive the pair of lock nuts 36, as shown. In order to make the wheels free ride in one direction, the clutch illustrated in Fig. 6 is employed. The bearing member 31 has the opposed tapered grooves $a$ and $b$ which accommodate the balls $c$ and $d$ respectively. The hub or boss 32 has the opposed bearing pockets or trap means $e$ and $f$ which will quickly arrest the balls when the hub 32 rotates in the direction of the arrow, but free the balls when it rotates in the opposite direction. This idea is not new and is used for allowing a wheel to rotate freely in one direction, but to be locked with something when the wheel is rotated in the other direction. This arrangement, allows the mower to be freely moved backwards, but to engage the cutter plate and reciprocate it when the mower is pushed forward.

At the lower end of each closure plate 26, there is a bossed portion 37 provided with a bore that is threaded to receive the threaded sleeve end 38 of a guide block 39. This guide block has a rectangular slot or groove 40 which snugly accommodates a sliding block 41. This block 41 has a stem 42 fixed thereto, the lower end of which provides a bearing for the cam-like wheel 24. Also fixed to this block and extending laterally therefrom through the bore of the sleeve, there is a stem or arm 43, the distal end of which is locked to the top of a bracket member 44. The bracket member has a bore at the top thereof through which the stem or arm 43 passes and the arm on each side of the bracket has a hole through which pass the holding cotter pins 44' and 45; the washers 46 and 47 are provided between their respective cotter pins and the sides of the bracket. The bracket is flanged at 48 and this flange is securely held to the top cutter plate 4 by the screws 49, as shown.

It should now be apparent, that when the mower is pushed along the ground by the handles 8, the tired portion of the wheels and the flange 22 revolve whereas the closure plate 26 does not in that this latter plate is fixed to the tie rod 3, and the handle elements 6 and 7, and the top cutter plate 4. As the wheel rotates, the cam-like wheel 24 travels along the serpentine path 23, and this little wheel 24 thus imparts a reciprocable motion to the block 41, arm 43, bracket 44 and the top cutter plate 4, both wheels act the same and cooperate so as to give positive forceful reciprocation to the top cutter plate 4.

The edger shown in Fig. 2 has all the parts just described above except for one of the wheels and part of the cutter plates, the handle of course being different in order to properly work the edger. In this case, the handle is but a single length of curved pipe or tubing 50 having the integral cross handle gripping means 51, but to better support the distal end of the cutter means, the handle brace 50' is provided. Fixed to the end of the bottom plate 5 is an upstanding brace plate 5' which is connected to the wheel fixed plate 26 by the cross bars or rods 26' and 26" as shown. On the upstanding plate there is a swingable arm $a$ which is pivoted at $b$ and has at its distal end an edging disc $c$; a catch or bracket $d$ being provided to hold the arm when not in use. Another catch or bracket arm $e$ is provided which is a spring member so that when the arm is positioned in the bracket $e$, it is held firmly and thus readied for working purposes in the well known manner. The cutter disc $c$ may be pivoted at $f$ if desired.

Figure 7:
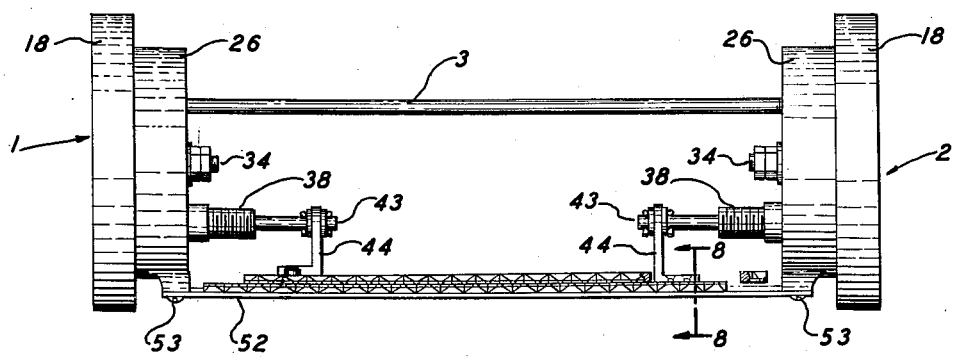
Figure 8:
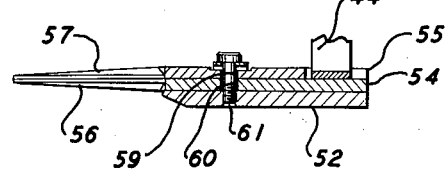
Fig. 8 is a sectional view taken substantially along line 8—8 of Fig. 7.
Figure 9:
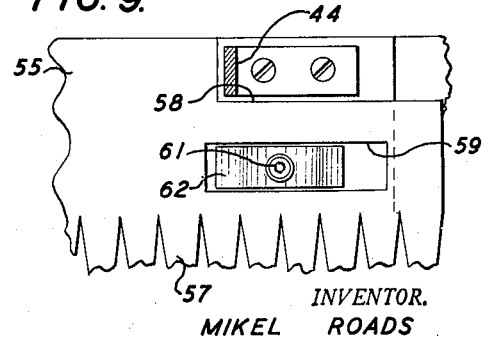
Fig. 9 is a plan view of a portion of the mower shown in Fig. 7.

The form of the invention shown in Figs. 7 to 9 is somewhat the same as that in the preferred form except that more than two plates are involved between the two wheels. The wheels and the reciprocating means are the same, therefore, in this form as illustrated, the same numerals are applied to them as in the preferred form of the invention.

In this modified form, a solid holding plate 52 is securely fixed to the wheel bosses by the screws 53, as shown. Just above this holding plate are the two reciprocatory cutter plates 54 and 55 with their plurality of tapered shearing projections 56 and 57 which slide over one another, but note, that both cutter plates reciprocate and that each plate has means such as screws holding them to their respective reciprocatory brackets 44. The top plate 55 has a cut-out portion 58 so that the bracket near wheel 2 can be secured to the under cutter plate 54, this cut-out portion being long enough to allow the top cutter plate to reciprocate its full distance. At each end of the cutter plates, there is a pair of alined elongated slots 59 and 60 to accommodate their respective guide screw 61 which is screwed into the bottom plate 52. Under the head of each screw there is a guide block 62 which rides in its respective slot and maintains the cutter plates in alinement while they reciprocate.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a mower device having a pair of spaced apart wheels which are each provided with spaced apart disc-like side walls and provided with wide annular flanges to provide an internal chamber in each wheel, structural means including axles to support and allow the wheels to rotate and which maintain the wheels in spaced apart position, plate means positioned between the wheels which have shearing projections extending therefrom, an upstanding bracket near each end of the plate means and fixed thereto, a threaded bore at the bottom of the inner wall of each wheel, a slotted guide means in each wheel chamber having a threaded extension passing through the bore of the wheel, a reciprocatory block in each guide means having a cam follower at one side facing the flange of the wheel and a stem fixed to another side which passes through the threaded extension and has its distal end attached to its respective bracket, and a serpentine groove in the inner face of the flange of each wheel and which engages its respective cam follower for the purposes disclosed.

2. In a wheel structure for a mower device which comprises a pair of cup-shaped elements nested together wall to wall, bearings between the walls, said elements providing an outer rotary member with a tire and an inner member with a wide annular flange having a grooved serpentine path on the inner surface thereof, a closure member spaced from the other members which has an annular flange that snugly engages the outer surfaces of the said wide annular flange, an axle through the center of the members and means for holding all the members together on the axle, clutch means between the wall of the two nested members allowing the inner nested member to rotate in but a single direction, a bore at the bottom of the closure member having a threaded sleeve therein which has a slotted guide means integral therewith and which is rigidly positioned between the closure member and the other two members, a sliding block in the slot having a wheel which engages the serpentine path of the flange, and an arm fixed to the sliding block and extending through the sleeve, the distal end of the arm having means for attachment to a reciprocable cutter plate, a fixed element having shearing projections which is attached to a bottom portion of the closure member and extends away therefrom to one side, another element consisting of the mentioned cutter plate having shearing projections juxtaposed on the first mentioned element, means dovetailing the elements together for mutual sliding relationship, a plurality of anti-friction bearing means between the elements, and a bracket means extending upwardly from the cutter plate element which has connection with the distal end of said arm.

MIKEL ROADS.

REFERENCES CITED

The following references are of record in the file of this patent:

UNITED STATES PATENTS

| Number | Name | Date |
| --- | --- | --- |
| 433,317 | Blakemore | July 29, 1890 |
| 763,125 | Sullivan | June 21, 1904 |
| 974,848 | Auble | Nov. 8, 1910 |
| 1,417,252 | Keyzer | May 23, 1922 |
| 2,124,632 | Richards | July 26, 1938 |

FOREIGN PATENTS

| Number | Country | Date |
| --- | --- | --- |
| 1,455 | Great Britain | Jan. 28, 1890 |